United States Patent
Kanagaraj et al.

(10) Patent No.: US 12,220,842 B2
(45) Date of Patent: Feb. 11, 2025

(54) SYSTEM AND METHOD FOR PREPARING PRE-IMPREGNATED CONTINOUS FIBER TAPES AND FILAMENTS

(71) Applicant: FABHEADS AUTOMATION PVT. LTD., Tamil Nadu (IN)

(72) Inventors: Dhinesh Ramupillai Kanagaraj, Tamil Nadu (IN); Akshay Ballal, Tamil Nadu (IN); Raghav Sanadi, Karnataka (IN)

(73) Assignee: FABHEADS AUTOMATION PVT. LTD., Tamil Nadu (IN)

( * ) Notice: Subject to any disclaimer, the term of this patent is extended or adjusted under 35 U.S.C. 154(b) by 235 days.

(21) Appl. No.: 18/020,950

(22) PCT Filed: Aug. 10, 2021

(86) PCT No.: PCT/IB2021/057359
§ 371 (c)(1),
(2) Date: Feb. 13, 2023

(87) PCT Pub. No.: WO2022/034491
PCT Pub. Date: Feb. 17, 2022

(65) Prior Publication Data
US 2023/0294330 A1    Sep. 21, 2023

(30) Foreign Application Priority Data
Aug. 11, 2020    (IN) .............................. 202041034421

(51) Int. Cl.
B32B 41/00    (2006.01)
B29B 11/16    (2006.01)
(Continued)

(52) U.S. Cl.
CPC ............ *B29B 15/122* (2013.01); *B29B 11/16* (2013.01); *C08J 5/06* (2013.01); *C08J 2300/22* (2013.01); *C08J 2300/24* (2013.01)

(58) Field of Classification Search
CPC . B29B 15/122; B29B 11/16; C08J 5/06; C08J 2300/22; C08J 2300/24; B29C 70/521; B29C 70/54; B29C 70/16
(Continued)

(56) References Cited

U.S. PATENT DOCUMENTS

| | | | |
|---|---|---|---|
| 2016/0096286 A1* | 4/2016 | Regan | B29B 11/16 156/181 |
| 2016/0122922 A1* | 5/2016 | Le Costaouec | D03D 37/00 28/271 |
| 2017/0246766 A1* | 8/2017 | Dehondt | B29B 13/08 |

* cited by examiner

*Primary Examiner* — Michael N Orlando
*Assistant Examiner* — Joshel Rivera
(74) *Attorney, Agent, or Firm* — Jose Cherson Weissbrot

(57) ABSTRACT

Disclosed is a system 100 and method 700 for preparing pre-impregnated continuous fiber tapes and filaments. The system comprises an agitation unit 101, an impregnation unit 102 and a consolidation unit 104. The agitation unit 101 is configured to draw fibers from a material source and oscillate in a back and forth motion, perpendicular to a feed direction of the fibers, thereby forming agitated fibers. The impregnation unit 102 is configured to impinge a metered matrix material on the moving agitated fibers and pass over stationary lobed surfaces 304 in the impregnation unit 102, thereby forming an impregnated tape 306. The consolidation unit 104 comprises a consolidation die 503, which is heated in order to pass the impregnated tape 306 through the consolidation die 503 and convert into continuous fiber filaments by a multistage channel configured to gradually decrease the cross section of the impregnated tape 306.

17 Claims, 8 Drawing Sheets

(51) Int. Cl.
  *B29B 15/12* (2006.01)
  *C08J 5/06* (2006.01)
(58) Field of Classification Search
  USPC .................... 156/60, 64, 350, 351, 378, 379
  See application file for complete search history.

SYSTEM AND METHOD FOR PREPARING PRE-IMPREGNATED CONTINOUS FIBER TAPES AND FILAMENTS

CROSS-REFERENCE TO RELATED APPLICATIONS AND PRIORITY

The present application claims priority from Indian patent application No. 202041034421 filed on 11 Aug. 2020, incorporated herein by a reference.

TECHNICAL FIELD

The present subject matter described herein, in general, relates to a field of making continuous reinforced fibers. More particularly, the present subject matter relates to a system and method for preparing pre-impregnated continuous fiber tapes and filaments.

BACKGROUND

Now-a-days, there is enormous development in the techniques of fiber prepreg fabrication. Existing continuous fiber reinforced filament and tape producing systems which use impregnation mechanism also suffer from various limitations. The existing systems use a bulk of plastic for reinforcement or impregnation in the fibers, at the initial stage itself. Pultrusion mechanism is used in the exiting systems. This causes a huge deposition of plastic or molten material, which may be a combination of fibers as well as plastic, in the interior space or walls of the die or the system. Moreover, such saturated plastic burns in the process of preparing the continuous fiber reinforced tapes or filaments, leading to damage of the die or the system. Therefore, a periodic cleaning or wiping of the plastic and a check on wear and tear of the system is continuously needed as the shape of the final product is dependent on the die. The other limitations comprise disability in managing plastic to fiber ratio for mass production, saturation of large quantity of molten plastic in the die or systems, requirement of rollers, less durability of the system, product with less tolerance, an expensive system, etc.

Thus, there is a long-standing need for a system and method for preparing pre-impregnated continuous fiber tapes and filaments which makes repairs, reuse and recycling of parts more economic, durable and feasible.

SUMMARY

This summary is provided to introduce the concepts related to a system and method for preparing pre-impregnated continuous fiber tapes and filaments and the concepts are further described in the detail description. This summary is not intended to identify essential features of the claimed subject matter nor it is intended to use in determining or limiting the scope of claimed subject matter. This system can be scaled to high volume production and can cater to on demand production as it is highly customizable.

In one implementation, the present subject matter describes a system for preparing pre-impregnated continuous fiber tapes and filaments, in accordance with the present subject matter. The system for preparing pre-impregnated continuous fiber tapes and filaments may comprise an agitation unit, wherein the agitation unit is configured to draw a plurality of fibers from a material source and oscillate the said plurality of fibers in a back and forth motion, perpendicular to a feed direction and along a plane of the plurality of fibers, thereby forming agitated fibers. The system may further comprise an impregnation unit, wherein the impregnation unit is configured to impinge a metered matrix material on the moving agitated fibers and pass the said agitated fibers over a plurality of stationary lobed surfaces in the impregnation unit, thereby forming an impregnated tape. The system may further comprise a consolidation unit comprising a consolidation die, wherein the consolidation die is heated in order to pass the impregnated tape through the said consolidation die and convert into one or more continuous fiber filaments by a multistage channel in the consolidation die configured to gradually decrease the cross section of the impregnated tape to increase impregnation efficiency.

In another implementation, the present subject matter describes a method for preparing pre-impregnated continuous fiber tapes and filaments, in accordance with the present subject matter. The method for preparing pre-impregnated continuous fiber tapes and filaments may comprise forming agitated fibers via an agitation unit, by drawing a plurality of fibers from a material source and oscillating the said plurality of fibers in a back and forth motion, perpendicular to a feed direction and along a plane of the plurality of fibers. The method may further comprise forming an impregnated tape via an impregnation unit, by impinging a metered matrix material on the moving agitated fibers and passing the said agitated fibers over a plurality of stationary lobed surfaces in the impregnation unit. The method may further comprise obtaining one or more continuous fiber filaments via a consolidation die, by heating the consolidation die and passing the impregnated tape through a multistage channel in the consolidation die configured to gradually decrease the cross section of the impregnated tape to increase impregnation efficiency.

BRIEF DESCRIPTION OF DRAWINGS

The detailed description is described with reference to the accompanying figures. In the Figures, the left-most digit(s) of a reference number identifies the Figure in which the reference number first appears. The same numbers are used throughout the drawings to refer like features and components.

DETAILED DESCRIPTION

Reference throughout the specification to "various embodiments," "some embodiments," "one embodiment,"

or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
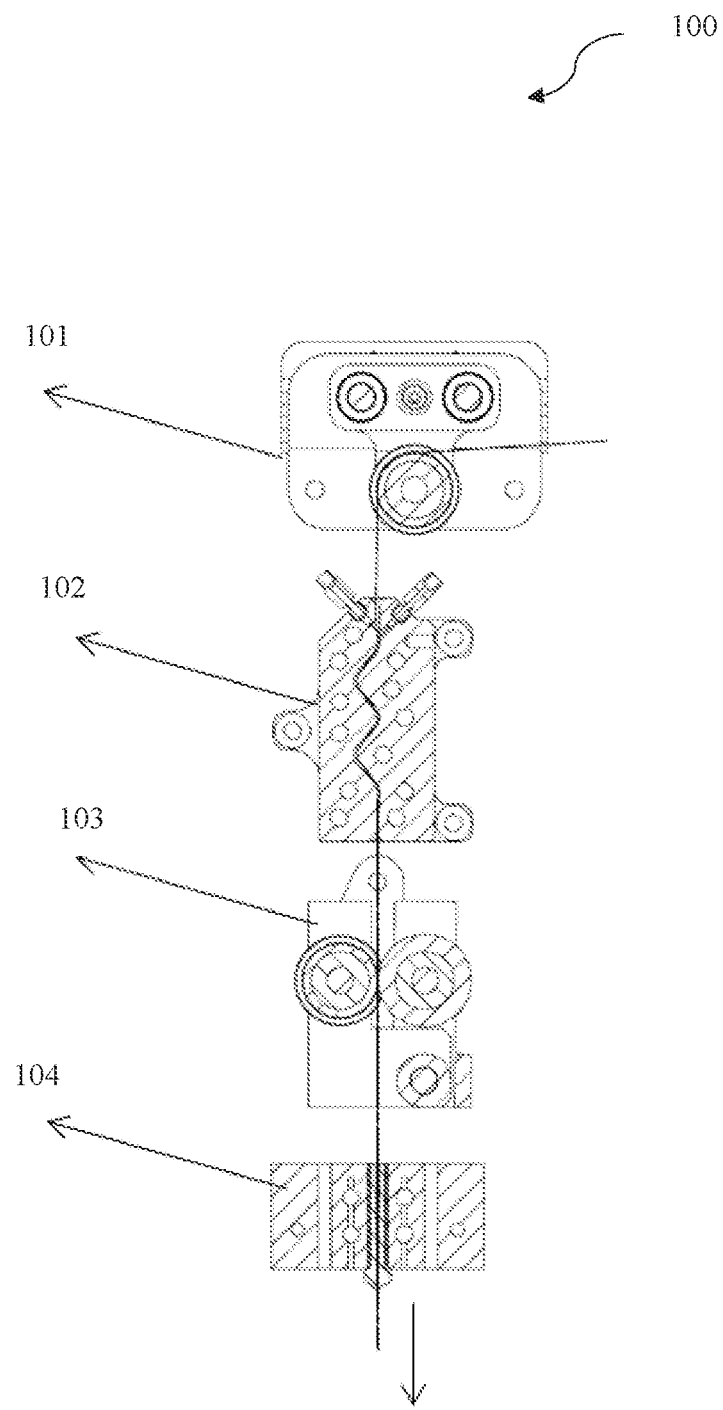
FIG. 1 illustrates a system 100 for preparing pre-impregnated continuous fiber tapes and filaments, in accordance with an embodiment of a present subject matter.

FIG. 1 illustrates a system 100 for preparing pre-impregnated continuous fiber tapes and filaments, in accordance with an embodiment of a present subject matter.

The system 100 for preparing pre-impregnated continuous fiber tapes and filaments may comprise an agitation unit 101, an impregnation unit 102 and a consolidation unit 104. In one embodiment, the agitation unit 101, the impregnation unit 102 and a consolidation unit 104 may be configured to operate continuously in a synchronous pattern to each other. In one embodiment, a material source used to supply fiber as a raw material to the system 100 may comprises one or more fiber rovings which are rolled or such like. In one embodiment, the fibers may be of carbon or such like. The continuous fiber tapes and filaments may be prepared by impregnating thermoplastic or thermosetting material in the fiber. In a preferred embodiment, thermoplastic may be impregnated the fiber. In one embodiment, the thermoplastic or impregnated material may be referred as a matrix material. Using thermoplastic material for preparing pre-impregnated continuous fiber tapes and filaments require fewer or no controls over the environment in the system 100. The thermoplastic material or matrix make repairs, reuse and recycling of 3D printed parts more economic and feasible. Although it is mentioned that thermoplastic material may be used, but may not be limited to said plastic. Any type of plastic may be used by making specific modifications or adjustments in the environment of the system 100. Some modifications or adjustments may be, but may not be limited to, lower heat, pressure based matrix injection, flow metering, curing system etc.

Figure 2:
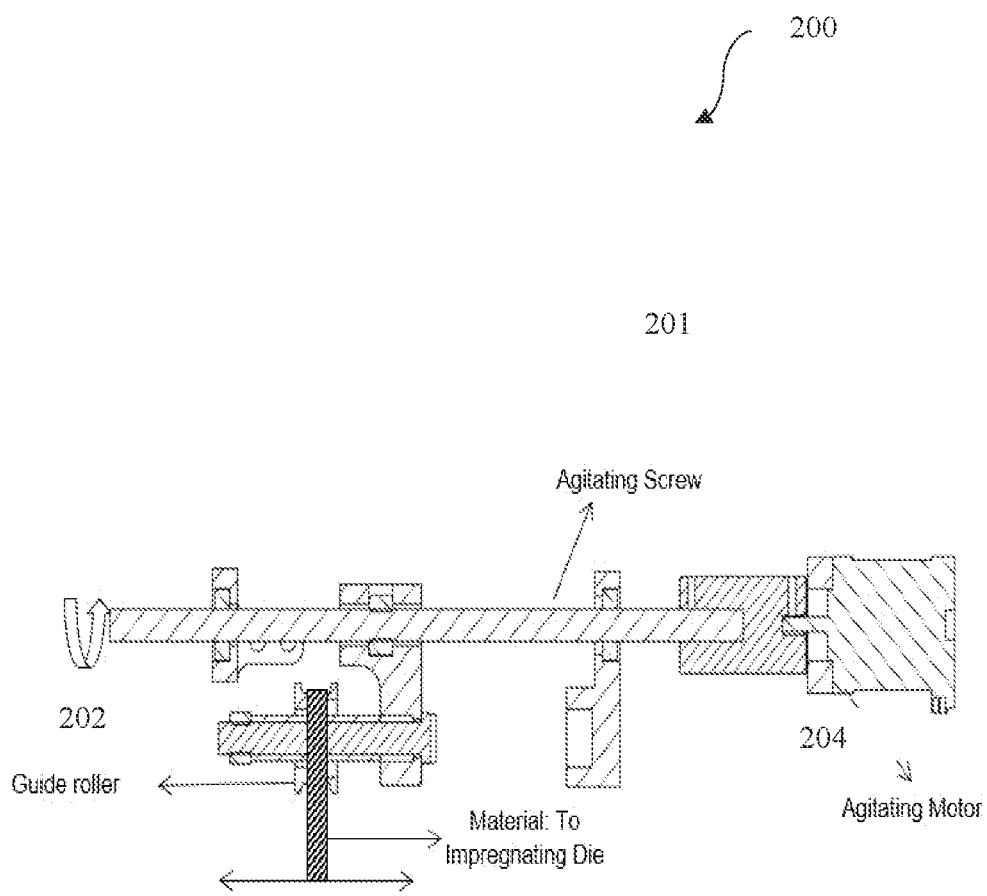
FIG. 2 illustrates an internal view 200 of an agitation unit 101, in accordance with an embodiment of a present subject matter.

Referring now to FIG. 2, an internal view 200 of an agitation unit 101, is illustrated in accordance with an embodiment of a present subject matter. In one embodiment, the agitation unit 101 may be configured to create a back and forth motion. In one embodiment, an agitation unit 101 configured to draw a plurality of fibers from a from a material source and oscillate the plurality of fibers in a back and forth motion, perpendicular to a feed direction and along a plane of the plurality of fibers, thereby forming a plurality of agitated fibers at an output of the agitation unit 101. In one embodiment, the agitation unit 101 may comprise an agitating screw 201, a guide roller 202 and an agitation motor 204. The guide roller 202 may be connectively coupled to an agitating screw 201 and an agitating motor 204. The agitation motor may be configured to actuate the agitation screw 201 and guide roller 202 in synchronization. The agitating screw may be configured to rotate and the guide roller 202 may be configured to oscillate in back and forth motion, thereby oscillating the plurality of fibers in a back and forth motion across the impregnation unit 102. The back and forth motion may enable spread of the plurality of fibers and distribution of the matrix material across the width of the agitated fibers formed. The back and forth motion of the plurality of fibers in the agitation unit 101 may minimize the volume of saturated deposits that accumulated in the corner of the impregnation unit 102, thus decreasing residence time and thermal degradation of the saturated deposits. Such motion may also cause shear thinning of the matrix material which may decrease the viscosity of the matrix material locally and improve impregnation in the impregnation unit 102 i.e. even distribution of matrix material in the fiber is obtained, thereby improving the fiber quality on output. In one embodiment, variable frequency of agitation unit 101 may be set based on parameters such as line speed of the fiber, viscosity of the plastic.

Figure 3:
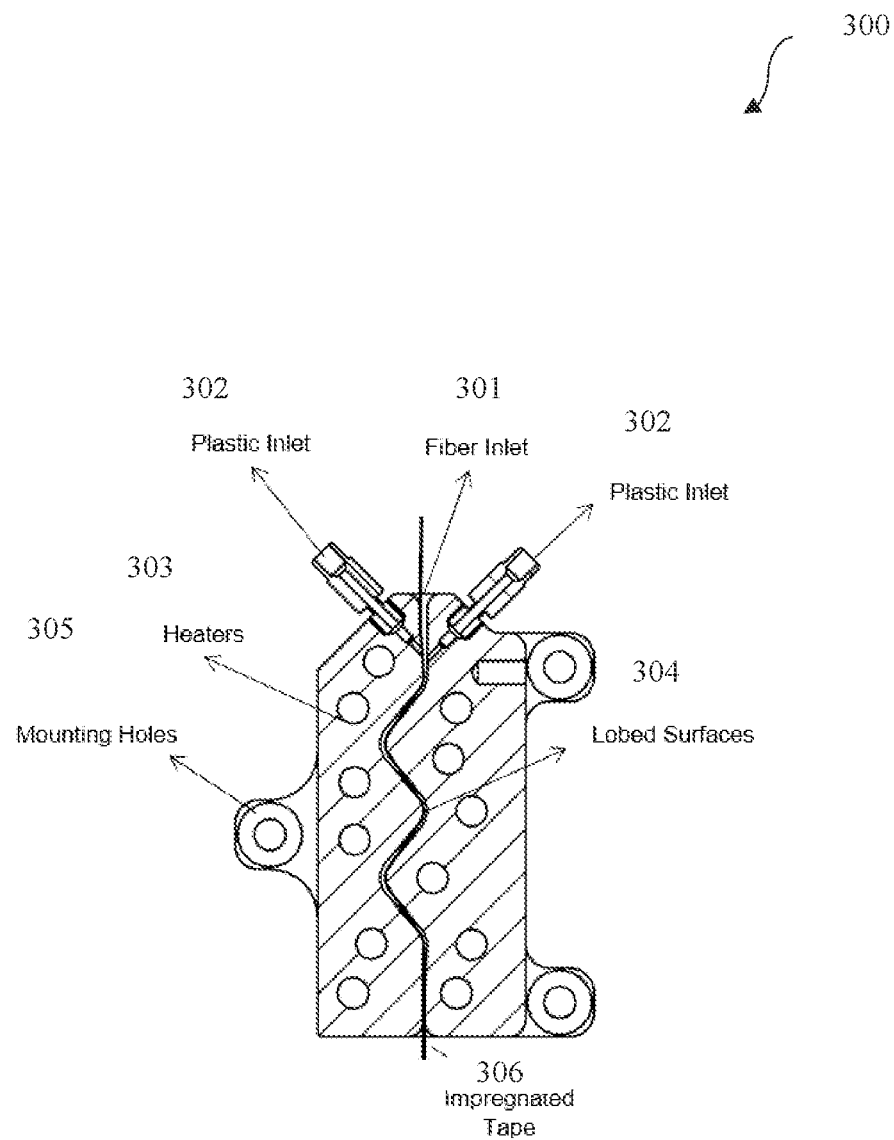
FIG. 3 illustrates an internal view 300 of an impregnation unit 102, in accordance with an embodiment of a present subject matter.

FIG. 3 illustrates an internal view 300 of an impregnation unit 102, in accordance with an embodiment of a present subject matter. The impregnation unit 102 may comprise a fiber inlet 301, at least two injection inlets 302, a plurality of stationary lobed surfaces 304, one or more heaters 303 and one or more mounting holes 305. In one embodiment, the agitated fibers from the agitation unit 101 may pass or enter the impregnation unit 102 via the fiber inlet 301. The agitated fibers may be melted via heaters 303 at the fiber inlet 301 in order to minimize the time of exposure of the agitated fibers to thermal degradation. The impregnation unit 102 may be configured to impinge the matrix material on the moving agitated fibers, wherein the matrix material may be injected in the impregnation unit 102 via at least two injection inlets 302. In one embodiment, the injection inlets 302 may be positioned horizontally apart from each other, with the fiber inlet 301 in between. In one embodiment, the matrix material may be metered before being injected into the impregnation unit 102. In other words, the metered matrix material is the calculated amount of matrix material required to be impinged or impregnated with the agitated fibers. Thus, a calculated amount of matrix material, which may be thermoplastic material, may be injected via injection inlets 302 into the impregnation unit 102. In one embodiment, the metered matrix material may be obtained by controlling an extrusion speed or a feed screw speed, thereby preventing build-up of the metered matrix material or a molten material comprising the mixture of the fiber tow and the metered matrix material. In one embodiment, the saturated deposits may be the molten material. Thus, the metered matrix material may impinge or impregnate with the agitated fibers in the impregnation unit 102. The impregnation unit 102 may be also configured to pass the said agitated fibers over the plurality of stationary lobed surfaces 304, thereby forming an impregnated tape 306. The mounting holes 305 may be used to affix the impregnation unit 102 in the system 100. In one embodiment, the system 100 utilizes the stationary lobed surfaces 304 instead of roller, which are currently used in the existing systems. This provides case and faster fabrication as the impregnation unit 102 does not comprise any moving part and prevents the maintenance cost of the rollers and is more economical. The stationary lobed surfaces 304 may be configured to drive the matrix material into the depths of the agitated fibers, distribute the matrix material evenly along the length of the agitated fibers, spread the fibers, and increase the tension in the agitated fibers. In one embodiment, the inner surface of the impregnation unit 102 may be coated with dry lubricant material like graphene to increase life of the impregnation unit 102 and to reduce friction and fiber sheering in the impregnation unit 102.

Figure 8:
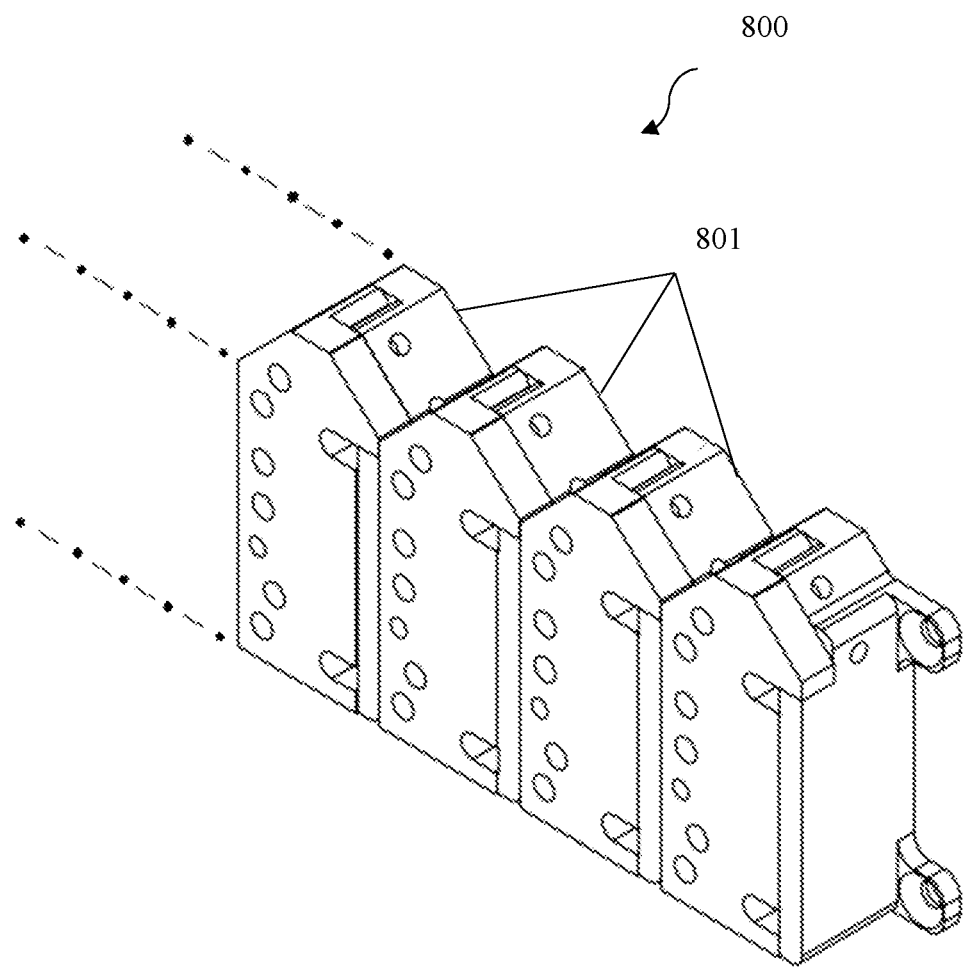
FIG. 8 illustrates a three-dimensional view 800 of multiple fiber passages 801 in the impregnation unit 102.

Referring FIG. 8, in one embodiment, the impregnation unit 102 may comprise multiple fiber passages 801. This may allow to develop multiple spools at the same time using one single impregnation unit 102. This results in lower heat requirement for the impregnation die 102 and thus a more economical setup. In one embodiment, more injection inlets may be provided towards the end of the impregnation unit 102 if higher production rate is required.

Figure 5:
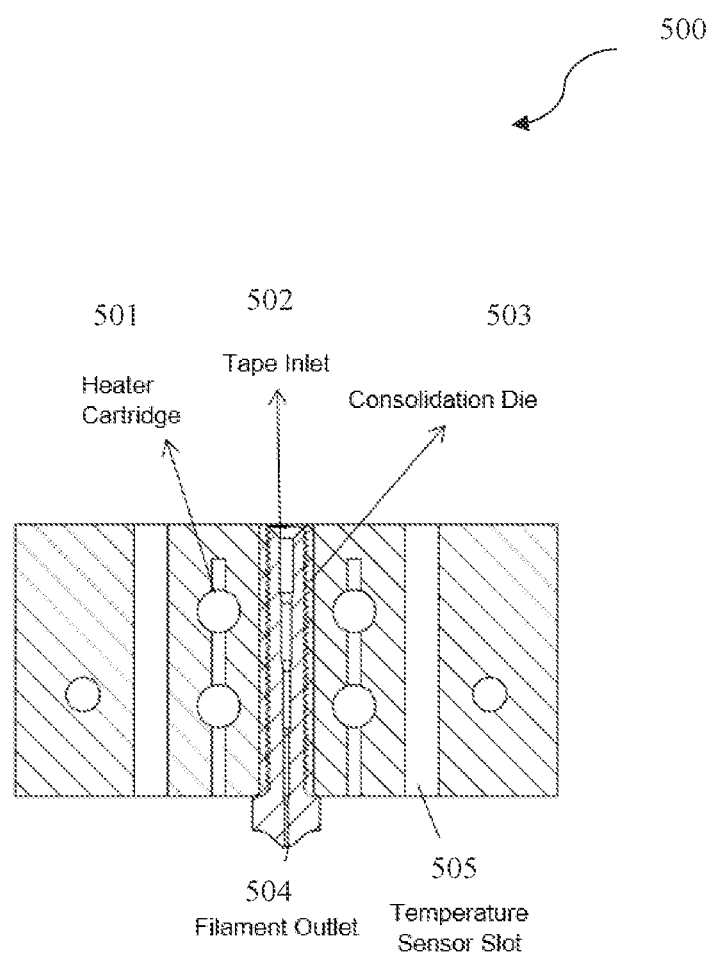
FIG. 5 illustrates an internal view 500 of a consolidation unit 104, in accordance with the embodiment of the present subject matter.

FIG. 5 illustrates an internal view 500 of a consolidation unit 104, in accordance with the embodiment of the present subject matter. In one embodiment, the consolidation unit 104 may comprise a heater cartridge 501, a tape inlet 502, a consolidation die 503, a filament outlet 504 and a temperature sensor slot 505. The impregnated tape 306 from the impregnation unit 102 may pass to the consolidation unit 104 via the tape inlet 502. The consolidation die 503 may be heated via heater cartridge 501 in order to convert the impregnated tape 306 into one or more continuous fiber filaments. The consolidation die 503 may comprise a multistage channel configured to gradually decrease the cross section of the impregnated tape 306 to increase impregnation efficiency. The gradual decrease in the cross section of the impregnated tape 306 is necessary in order to prevent the breakage of the continuous fiber filaments which may occur if the cross section of the impregnated tape is directly narrowed to the cross section of continuous fiber filament. Thus, using a multistaged channel enables in gradually moulding of the impregnated tape 306 into a round cross section forming continuous fiber filament without damaging the fibers. This also helps in increasing the throughput of the system 100 by allowing the system 100 to run at relatively faster speed compared to a single stage consolidation. Therefore, the continuous fiber filaments may be obtained from the filament outlet 504. The continuous fiber filament may be round shaped with impregnated metered matrix material such as thermoplastic. The heater cartridge 501 may be slotted into holes.

Figure 4:
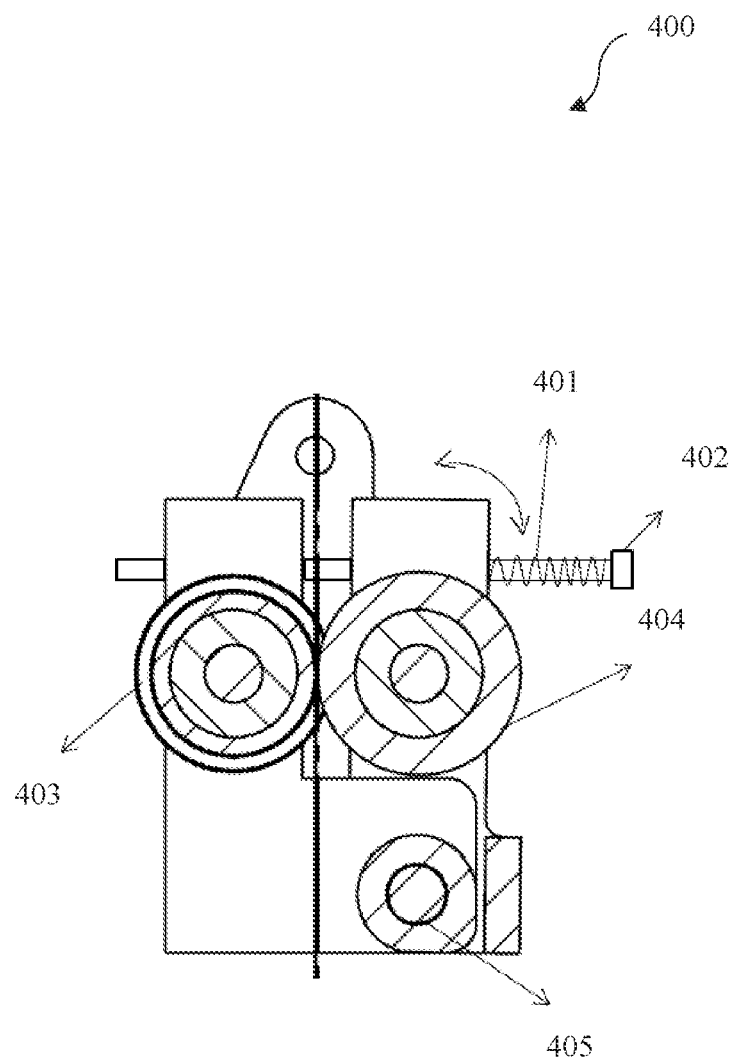
FIG. 4 illustrates an internal view 400 of a set of warmed pinch rollers 103, in accordance with an embodiment of a present subject matter.

FIG. 4 illustrates an internal view 400 of a set of warmed pinch rollers 103, in accordance with an embodiment of a present subject matter. In one embodiment, the system 100 may optionally comprise a set of warmed pinch rollers 103 configured to provide tensioning and a compaction force to the impregnated tape 306 from the impregnation unit 102, in order to iron out voids present within the impregnated tape 306. The set of warmed pinch rollers 103 may be positioned between the impregnation unit 102 and consolidation unit 104. The set of warmed pinch rollers 103 may comprise a fixed roller 403, a pivoting roller 404, a compaction spring 401, a pivot 405 and a tension adjuster 402. The alignment of the pivoting roller 403 and fixed roller 403 may be adjusted by the tension adjuster 402 and compaction spring 401, wherein the fixed roller 403 is stationary and pivoting roller 404 is movable. The fixed roller 403 and the pivoting roller 404 may be placed sufficiently close to each other in order to ensure that the matrix material is not completely solidified. However, the fixed roller 403 and pivoting roller 404 are not be placed so close to each other that the material on the surface of the impregnated tape 306 may adhere to one of the or both the rollers. The higher tension provided to the impregnation tape 306 by the set of warmed pinch rollers 103 may keep the fibers in the impregnated tape 306 intact during consolidation. In one embodiment, the set of warmed pinch rollers 103 may be heated by, but may not be limited to hot gas, infrared heating element, and such like. Such heaters may be provided in order to ensure that the contact with the tape does not cause excessive cooling.

Figure 6:
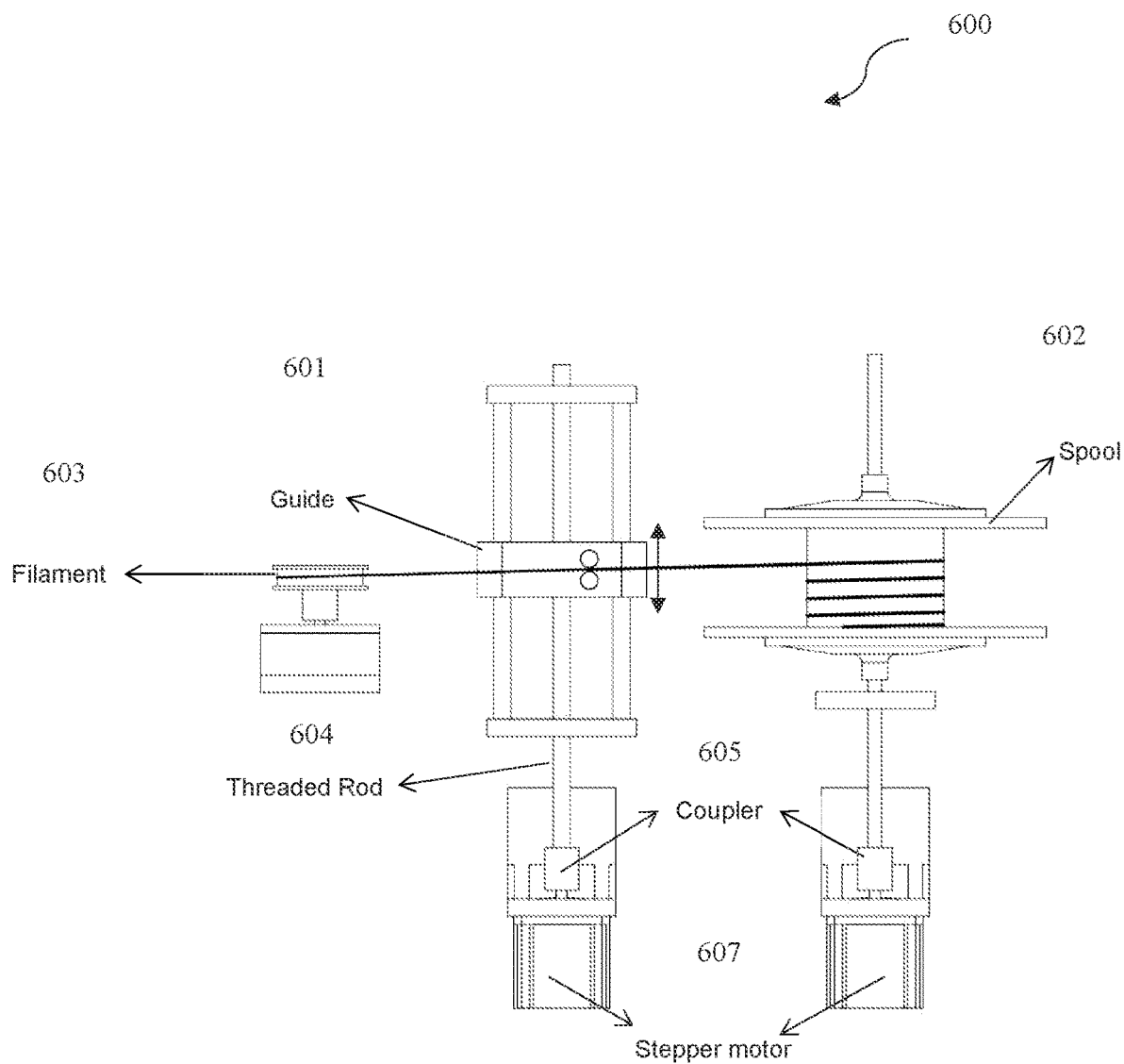
FIG. 6 illustrates a spooling mechanism 600, in accordance with the embodiment of the present subject matter.

FIG. 6 illustrates a spooling mechanism 600, in accordance with the embodiment of the present subject matter. The spooling mechanism 600 may be the existing mechanism known in the art. In one embodiment, the spooling mechanism may comprise a guide 601, a spool 602, continuous fiber filament 603, a threaded rod 604, a coupler 605 and a stepper motor 607. In one embodiment, the spooling mechanism 600 may be required after the consolidation process in the consolidation unit 104, in order to spool the continuous fiber filaments 603 obtained from the consolidation unit 104. The spooling mechanism 600 may collect the continuous fiber filaments 603 in a uniform pattern on the spool 602. The guide 601 may oscillate in a back and forth motion in order to wrap the incoming continuous fiber filament 603. This may ensure that there is no slippage of the continuous fiber filaments once they may be wound onto the spool 602. This may also ensure that the upper layers of the spooled continuous fiber filaments 603 do not crush the lower layers. In one embodiment, the spooling mechanism 600 may be monitored by an encoder. The encoder may be configured to monitor the line speed of the continuous fiber filaments 603. In one embodiment, the stepper motor 607 speed may be altered as the size of the spool 602 grows to ensure a uniform line speed. The threaded rod 604 may be configured to rotate in order to cause a to and fro motion of the guide for even distribution of material on the spool. The coupler 605 may be configured to connect the motor shaft to the threaded rod.

Figure 7:
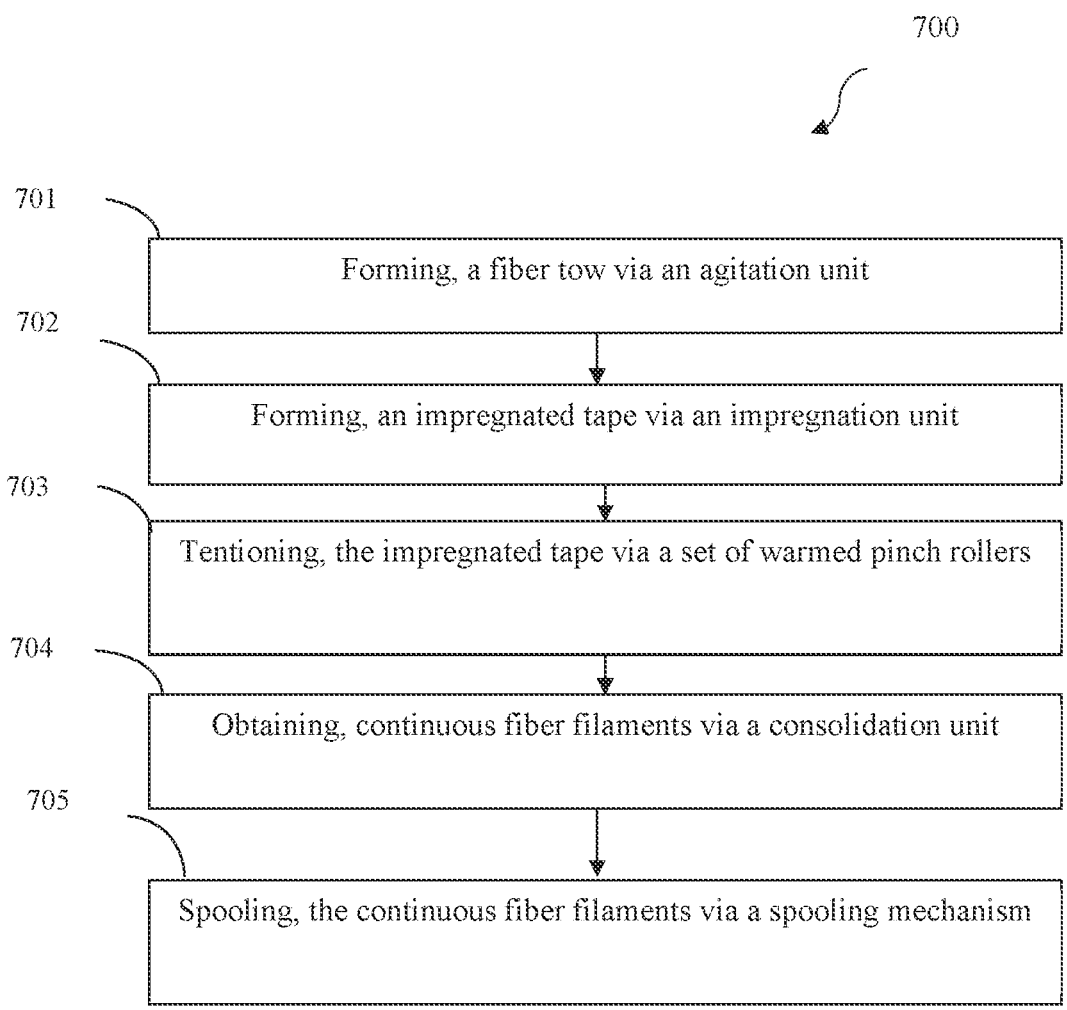
FIG. 7 illustrates a method 700 for preparing pre-impregnated continuous fiber tapes and filaments, in accordance with the embodiment of the present subject matter.

FIG. 7 illustrates a method 700 for preparing pre-impregnated continuous fiber tapes and filaments, in accordance with the embodiment of the present subject matter.

At step 701, the agitation unit 101 may be configured for drawing a plurality of fibers from a material source such as a roll of fiber roving and oscillating the plurality of fibers in a back and forth motion, perpendicular to a feed direction and along a plane of the plurality of fibers, thereby forming a plurality of agitated fibers. In one embodiment, the agitation unit 101 may comprise an agitating screw 201, a guide roller 202 and an agitation motor 204. The guide roller 202 may be connectively coupled to an agitating screw 201 and an agitation motor 204. The agitation motor may be configured to actuate the agitation screw 201 and guide roller 202 in synchronization. The agitating screw may be configured to rotate and the guide roller 202 may be configured to oscillate in back and forth motion, thereby oscillating the plurality of fibers in a back and forth motion across the impregnation unit 102. The back and forth motion may enable spread of the plurality of fibers and distribution of the matrix material across the width of the agitated fibers formed.

At step 702, the impregnation unit 102 may be configured for forming an impregnated tape 306, by impinging a metered matrix material on the moving agitated fibers and passing the said agitated fibers over a plurality of stationary lobed surfaces 304 in the impregnation unit 102. In one embodiment, the agitated fibers from the agitation unit 101 may pass or enter the impregnation unit 102 via the fiber inlet 301. The agitated fibers may be melted via heaters 303 at the fiber inlet 301 in order to minimize the time of exposure of the agitated fibers to thermal degradation. In one embodiment, the injection inlets 302 may be positioned horizontally apart from each other, with the fiber inlet 301 in between. In one embodiment, the matrix material may be metered before being injected into the impregnation unit 102. In other words, the metered matrix material is the calculated amount of matrix material required to be impinged or impregnated with the agitated fibers. Thus, a calculated amount of matrix material, which may be thermoplastic material, may be injected via injection inlets 302 into the impregnation unit 102. Thus, the metered matrix material may impinge or impregnate with agitated fibers in the impregnation unit 102. The stationary lobed surfaces 304 may be configured to drive the matrix material into the depths of the agitated fibers, distribute the matrix material evenly along the length of the agitated fibers, spread the fibers, and increase the tension in the agitated fibers.

At step 703, optionally, the set of warmed pinch rollers 103 may be configured to provide tensioning and a compaction force to the impregnated tape 306 in order to iron out voids present within the impregnated tape 306. The set of warmed pinch rollers 103 may be are positioned between the impregnation unit 102 and the consolidation unit 104. The set of warmed pinch rollers 103 may comprise a fixed roller 403, a pivoting roller 404, a compaction spring 401 and a tension adjuster 402. The alignment of the pivoting roller 403 and fixed roller 403 may be adjusted by the tension adjuster 402 and compaction spring 401, wherein the fixed roller 403 is stationary and pivoting roller 404 is movable.

At step 704, the consolidation die 503 in the consolidation unit 104 may be configured for obtaining one or more continuous fiber filaments by heating the consolidation die 503 and passing the impregnated tape 306 through a multistage channel in the consolidation die 503 configured to gradually decrease the cross section of the impregnated tape 306 to increase impregnation efficiency. The gradual decrease in the cross section of the impregnated tape 306 is necessary in order to prevent the breakage of the continuous fiber filaments which may occur if directly the cross section of the impregnated tape is narrowed to the cross section of continuous fiber filament. Thus, using a multistaged channel enables in gradually moulding of the impregnated tape 306 into a round cross section forming continuous fiber filament without damaging the fibers.

At step 705, the spooling mechanism 600 may be required after the consolidation process in the consolidation unit 104, in order to spool the continuous fiber filaments 603 obtained from the consolidation unit 104. The spooling mechanism 600 may collect the continuous fiber filaments 603 in a uniform pattern on the spool 602.

Some embodiments of the present invention may comprise encoders, processors, or controllers in order to execute instructions for configuring and controlling the required temperature and other environment conditions inside the system 100.

Thus, the system 100 and method 700 for preparing pre-impregnated continuous fiber tapes and filaments is cost effective and reduces the complexity in the mass production of impregnated continuous fiber tapes and filaments. This is possible due to the metered injection of matrix material such as thermoplastic, which not only provides desired and calculated amount of matrix material to be impregnated with the fibers, but also reduces the saturation of bulk of molten material in the impregnation unit 102. The plastic to fiber ratio is also improved. The cleaning and wiping process for the removal of molten material is also reduced, thereby increasing the durability of the system 100 and various components of the system 100 without damage. Moreover, the distortion in the shape of the impregnated tapes and filaments doesn't take place as the system 100 remains clean by preventing deposition of molten material. All the units in the system 100 may work continuously and efficiently to deliver a highly tolerant impregnated continuous fiber tapes and filaments.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

Although implementations for the system 100 and method 700 for preparing pre-impregnated continuous fiber tapes and filaments have been described in language specific to structural features and/or methods, it is to be understood that the appended claims are not necessarily limited to the specific features or methods described. Rather, the specific features and methods are disclosed as examples of implementations for the system 100 and method 700 for preparing pre-impregnated continuous fiber tapes and filaments.

We claim:

1. A system 100 for preparing pre-impregnated continuous fiber tapes and filaments, the system comprising:
    an agitation unit 101 configured to draw a plurality of fibers from a material source and oscillate the plurality of fibers in a back and forth motion, perpendicular to a feed direction and along a plane of the plurality of fibers, thereby forming a plurality of agitated fibers;
    an impregnation unit 102 configured to impinge a metered matrix material on the moving agitated fibers and pass the said agitated fibers over a plurality of stationary lobed surfaces 304 in the impregnation unit 102, thereby forming an impregnated tape 306; and
    a consolidation unit 104 comprising a consolidation die 503, wherein the consolidation die 503 is heated in order to pass the impregnated tape 306 through the said consolidation die 503 and convert the impregnated tape 306 into one or more continuous fiber filaments, wherein a multistage channel in the consolidation die 503 is configured to gradually decrease cross section of the impregnated tape 306 to increase impregnation efficiency.

2. The system 100 as claimed in claim 1, further comprises a set of warmed pinch rollers 103 configured to provide tensioning and a compaction force to the impregnated tape 306 in order to iron out voids present within the impregnated tape 306 and wherein the set of warmed pinch rollers 103 are positioned between the impregnation unit 102 and the consolidation unit 104.

3. The system 100 as claimed in claim 1, wherein the metered matrix material is thermoplastic or thermosetting material.

4. The system 100 as claimed in claim 1, wherein the agitation unit 101 comprises a guide roller 202 configured to oscillate the plurality of fibers in a back and forth motion, wherein the guide roller 202 is connectively coupled to an agitating screw 201 and an agitating motor 204.

5. The system 100 as claimed in claim 1, wherein the impregnation unit 102 comprises one or more heaters 303 and at least two injection inlets 302 configured to inject the metered matrix material into the impregnation unit 102, wherein the injection inlets 302 are positioned horizontally apart from each other, with a fiber inlet 301 in between configured to deliver the agitated fibers passed from the agitation unit 101 to the impregnation unit 102, wherein the metered matrix material is obtained by controlling an extrusion speed or a feed screw speed, thereby preventing build-up of the metered matrix material or a molten material comprising the mixture of a fiber tow and the metered matrix material.

6. The system 100 as claimed in claim 2, wherein the set of warmed pinch rollers 103 comprises a fixed roller 403, a pivoting roller 404, compaction spring 401 and a tension adjuster 402, wherein the alignment of the pivoting roller 404 and fixed roller 403 is adjusted by the tension adjuster 402 and compaction spring 401, wherein the fixed roller 403 is stationary and pivoting roller 404 is movable.

7. The system 100 as claimed in claim 1, wherein the consolidation unit 104 comprises a heater cartridge 501 that is slotted into holes.

8. The system 100 as claimed in claim 1, wherein the agitated fibers are melted at the fiber inlet 301 of the impregnation unit 102 in order to minimize the time of exposure of the agitated fibers to thermal degradation.

9. The system 101 as claimed in claim 1, wherein the continuous fiber filaments are round shaped.

10. The system 101 as claimed in claim 1, wherein the impregnation unit 102 comprises multiple fiber passages 801 which allow to develop multiple spools at the same time using one single impregnation unit 102, thereby resulting in lower heat requirement for the impregnation die 102 and an economical setup.

11. The system as claimed in claim 1, wherein the inner surface of the impregnation unit 102 is coated with dry lubricant material like graphene to increase life of the impregnation unit 102 and to reduce friction and fiber sheering in the impregnation unit 102.

12. The system as claimed in claim 1, wherein variable frequency of agitation unit 101 is set based on parameters such as line speed of the fiber, viscosity of the plastic.

13. A method 700 for preparing pre-impregnated continuous fiber tapes and filaments comprising:
    forming a plurality of agitated fibers via an agitation unit 101, by drawing a plurality of fibers from a material source and oscillating the plurality of fibers in a back and forth motion, perpendicular to a feed direction and along a plane of the plurality of fibers;
    forming an impregnated tape 306 via an impregnation unit 102, by impinging a metered matrix material on the moving agitated fiber and passing the said agitated fiber over a plurality of stationary lobed surfaces 304 in the impregnation unit 102; and
    obtaining one or more continuous fiber filaments via a consolidation die 503 in a consolidation unit 104, by heating the consolidation die 503 and passing the impregnated tape 306 through a multistage channel in the consolidation die 503 configured to gradually decrease the cross section of the impregnated tape 306 to increase impregnation efficiency.

14. The method 700 of claim 13, wherein tensioning and a compaction force is provided by a set of warmed pinch rollers 103 in the system 100 in order to iron out voids present within the impregnated tape 306 and wherein the set of warmed pinch rollers 103 are positioned between the impregnation unit 102 and the consolidation unit 104.

15. The method 700 of claim 13, wherein the impregnation unit 102 further comprises one or more heaters 303 and at least two injection inlets 302 configured to inject the metered matrix material into the impregnation unit 102, wherein the injection inlets 302 are position horizontally apart from each other, with a fiber inlet 301 in between configured to deliver the agitated fibers passed from the agitation unit 101 to the impregnation unit 102, wherein the metered matrix material is obtained by controlling an extrusion speed or a feed screw speed, thereby preventing build-up of the metered matrix material or a molten material comprising the mixture of the fiber tow and the metered matrix material.

16. The method 700 of claim 13, wherein the agitated fibers are melted at the fiber inlet 301 of the impregnation unit 102 in order to minimize the time of exposure of the agitated fibers to thermal degradation.

17. The method 700 as claimed in claim 13, wherein the continuous fiber filaments are round shaped.

* * * * *